United States Patent [19]
Miyagi et al.

[11] Patent Number: 5,115,256
[45] Date of Patent: May 19, 1992

[54] BEAM RECORDER WITH SCAN POSITION CONTROL

[75] Inventors: Ken Miyagi, Yokohama; Hiroyuki Miyake, Kawasaki, both of Japan

[73] Assignee: Canon Kabushiki Kaisha, Tokyo, Japan

[21] Appl. No.: 515,346

[22] Filed: Apr. 30, 1990

Related U.S. Application Data

[63] Continuation of Ser. No. 244,409, Sep. 14, 1988, abandoned.

[30] Foreign Application Priority Data

Sep. 14, 1987 [JP] Japan .................................. 61-228474

[51] Int. Cl.⁵ .............................................. H04N 1/21
[52] U.S. Cl. ................................. 346/108; 358/296
[58] Field of Search ............... 346/107, 108, 160, 766; 358/296, 308, 302

[56] References Cited

U.S. PATENT DOCUMENTS

| | | | |
|---|---|---|---|
| 3,848,087 | 11/1974 | Carrell | 346/108 |
| 4,761,662 | 8/1988 | Yoshimoto et al. | 346/108 |
| 4,903,067 | 2/1990 | Murayama | 346/160 |
| 4,975,741 | 12/1990 | Tanaka | 355/206 |

Primary Examiner—Mark J. Reinhart
Attorney, Agent, or Firm—Fitzpatrick, Cella, Harper & Scinto

[57] ABSTRACT

A recording apparatus comprises a source for generating a beam to record images on a recording medium by using the beam and makes fine adjustment of the recording position of the beam for obtaining high-quality images.

16 Claims, 9 Drawing Sheets

BEAM RECORDER WITH SCAN POSITION CONTROL

This application is a continuation of application Ser. No. 07/244,409 filed Sep. 14, 1988, now abandoned.

BACKGROUND OF THE INVENTION

1. Field of the Invention

The present invention relates to a recording apparatus for recording images with the beam of a laser printer or the like.

2. Related Background Art

FIG. 7 is a cross-sectional view illustrating a drum-type laser printer. A printer body 41 comprises a paper-feeding section, an image-forming section, a laser exposure section, a conveying section, a fixing section, and a paper discharge section.

A paper-feeding cassette 42 is adapted to feed recording paper 43 into the printer body 41 by the rotation of a feed roller 44. A pair of registration rollers 45 temporarily stop the recording paper 43 which has been fed, and, after adjusting the timing with the tip of an image on a photosensitive drum 51M, feed the recording sheet 43. A conveying belt 46 conveys the fed recording paper 43 in a flat state. Chargers 47, 48 apply a high voltage to the conveyed recording paper 43 and thereby cause the recording sheet 43 to be attracted to and carried on a conveying belt 46.

A laser unit 49M applies a laser beam modulated in such a manner as to be turned ON and OFF in correspondence with a magenta signal from among the image signals transmitted from an external device, so as to scan the photosensitive drum 51M. A developer 50M develops with a magenta toner an electrostatic latent image for magenta formed on the photosensitive drum 51M. A charger 52M charges the photosensitive drum 51M uniformly before image formation. A cleaner section 53M recovers the magenta toner remaining in the photosensitive drum 51M and cleans the photosensitive drum 51M. A transfer charger 54M transfers the magenta image developed on the photosensitive drum 51M onto the recording paper 43 being conveyed. A magenta station MS comprises the above-mentioned components 49M–54M.

A laser unit 49C applies a laser beam modulated in such a manner as to be turned ON and OFF in correspondence with a cyan signal from among the image signals transmitted from an external device, so as to scan the photosensitive drum 51C. A developer 50C develops with a cyan toner an electrostatic latent image for cyan formed on the photosensitive drum 51C. A charger 52C charges the photosensitive drum 51C uniformly before image formation. A cleaner section 53C recovers the cyan toner remaining in the photosensitive drum 51C to clean the photosensitive drum 51C. A transfer charger 54C transfers the cyan image developed on the photosensitive drum 51C onto the recording paper 43 being conveyed A cyan station CS comprises the above-mentioned components 49C–54C.

A laser unit 49Y applies a laser beam modulated in such a manner as to be turned ON and OFF in correspondence with a yellow signal from among the image signals transmitted from an external device, so as to scan the photosensitive drum 51Y. A developer 50Y develops with a yellow toner an electrostatic latent image for yellow formed on the photosensitive drum 51Y. A charger 52Y charges the photosensitive drum 51Y uniformly before image formation. A cleaner section 53Y recovers the yellow toner remaining in the photosensitive drum 51Y to clean the photosensitive drum 51Y. A transfer charger 54Y transfers the yellow image developed on the photosensitive drum 51Y onto the recording paper 43 being conveyed. A yellow station YS comprises the above-mentioned components 49Y–54Y.

A laser unit 49BK applies a laser beam modulated in such a manner as to be turned ON and OFF in correspondence with a black signal from among the image signals transmitted from an external device, so as to scan the photosensitive drum 51BK. A developer 50BK develops with a black toner an electrostatic latent image for black formed on the photosensitive drum 51BK. A charger 52BK charges the photosensitive drum 51BK uniformly before image formation. A cleaner section 53BK recovers the black toner remaining in the photosensitive drum 51BK to clean the photosensitive drum 51BK. A transfer charger 54BK transfers the black image developed on the photosensitive drum 51BK onto the recording paper 43 being conveyed. A black station BKS comprises the above-mentioned components 49BK–54BK.

The recording paper 43 onto which the four color toners have been transferred is thermally compressed by the fixer 55, with the result that a color image is fixed on the recording paper 43. If this fixing process is completed, the recording paper 43 is discharged from the printer body 41, and is placed on a discharge tray 56.

FIG. 8 is a perspective view illustrating a laser beam scanning process using the laser unit shown in FIG. 7, the same components as those shown in FIG. 7 being denoted by the same reference numerals.

In this drawing, a scanner motor 61BK is adapted to rotate a polygon mirror 62BK constituted by a 10-face mirror in the direction of the arrow at a fixed speed. A semiconductor laser 63BK is modulated in such a manner as to be turned ON and OFF in accordance with an image signal input. A cylindrical lens 64BK directs a laser beam emitted from the semiconductor laser 63BK and applies the same to the polygon mirror 62BK. An f/θ lens 65BK causes the laser beam deflected by the polygon mirror 62BK to effect horizontal scanning at a uniform speed with respect to the axial direction of the photosensitive drum 51 BK. A reflection mirror 66BK introduces the laser beam to be deflected into a beam detection sensor (BD sensor) 67BK. The BD sensor generates a horizontal synchronization signal which serves as a reference for writing in the main scanning direction (horizontal direction) of the photosensitive drum 51M, and delivers its output to a printer controlling section (not shown). It should be noted that, although a description has been given of an arrangement of the laser unit by using the black station BKS as an example, the other stations are provided with identical arrangements.

FIG. 9 is a top plan view illustrating an arrangement for detecting the rotating speed of the polygon mirror 62BK shown in FIG. 8. In FIG. 9, the same components as those shown in FIG. 8 are denoted by the same reference numerals.

In this drawing, an FG (frequency generator) sensor 68BK outputs a speed detection signal FG to a PLL (phase lock loop) circuit (constituted by a device such as a PLLIC (phase lock loop integrating circuit)) for controlling the rotation of the scanner motor 61BK. A slit encoder 69, which is provided with 10 slits 70 (corresponding to the number of sides of polygon mirror 62BK), as illustrated in the drawing, is secured to a rotating shaft of the scanner motor 61BK and is adapted to rotate at the same speed as the polygon mirror 62BK. As the slit encoder 69 passes the position of the FG sensor 68BK ten times during one rotation, the frequency is measured. The slits 70 are constituted by, for example, magnets, which can be detected by the FG sensor 68BK which is constituted by an electromagnetic pickup or the like.

If the frequency of the rotating shaft of the scanner motor 61BK is, for instance, 12,000 rpm, an FG frequency ($f_{FG}$) is determined by the following formula (1):

$$f_{FG} = 12{,}000 \times 1/60 \times 10 = 2 \; (kHz) \qquad (1)$$

Accordingly, if the reference frequency to be input to the PLL circuit is set to 2 (kHz) obtained in Formula (1) above, it becomes possible to effect the synchronization of rotation whereby both the number of revolutions and a phase corresponding to the reference frequency are synchronized.

Therefore, if a common reference oscillator is used for controlling the rotation of the polygon mirrors in the stations and if the motors are driven by a common reference oscillator, the polygon mirrors of the all the stations rotate synchronously. Hence, it becomes possible to improve the accuracy in registration.

However, in order to meet the aforementioned relationship, the installation positions of the BD sensor 67BK and the FG sensor 68BK must be set in such a manner as to be aligned with the surface position of the polygon mirror 62BK. Moreover, the same installation accuracy is required of the other stations as well. 10 However, in the light of the assembly process, it is impossible to effect installation in a state which meets the aforementioned relationship.

For this reason, the top margin of an image formed by the photosensitive drums 51M, 51C, 51Y and 51BK with respect to the recording paper 43 varies slightly. Furthermore, concerning the accuracy of the installation interval of the stations, it is difficult to install them in units of 63.5 μm (equivalent to the width of one picture element), and the factor of variation in the top margin adds to this difficulty.

Accordingly, adjustment of such a top margin can be effected by adjusting the writing timing of the laser beam.

With such an adjusting method, however, the adjusting units depend on the interval of horizontal scanning, i.e., the laser beam performs horizontal scanning at a predetermined interval (the interval of one picture element). As a result, the unit of adjustment, for instance, between the starting position of writing a black image and the starting position of writing a magenta image inevitably becomes the unit of one picture element, so that color offsetting of a maximum of a ½ picture element occurs.

Consequently, particularly when a fine black character image is formed, there has been a problem in that the black-character images cannot be formed with excellent reproducibility.

If an attempt is made to overcome such a problem through mechanical precision alone, since the unit of one picture element requires fine adjustments, it is impossible to follow its variation by periodical inspection or the like alone. Thus, the situation has been such that there has been a strong demand for overcoming this problem.

Hence, as measures for overcoming the offsetting of the position of an image, the present applicant filed U.S. application Ser. No. 149526 (filed Jan. 28, 1988), U.S. application Ser. No. 187,078 (filed Apr. 27, 1988), and U.S. application Ser. No. 195,802 (filed May 19, 1988). However, there has been demand for further improvements.

SUMMARY OF THE INVENTION

Accordingly, an object of the present invention is to overcome the above-described drawbacks of the conventional art.

Another object of the present invention is to provide a recording apparatus which makes it possible to obtain reproduced images of high quality.

Still another object of the present invention is to provide a recording apparatus which makes it possible to obtain reproduced images of high picture quality with a simple arrangement.

A further object of the present invention is to provide a recording apparatus which is capable of adjusting the position of image formation with high accuracy.

A still further object of the present invention is to provide a recording apparatus which is capable of forming images at an accurate position without using a complicated arrangement.

A further object of the present invention is to provide a recording apparatus which is capable of making fine adjustments.

A further object of the present invention is to provide a recording apparatus which is capable of performing compensation of offsetting of images with higher precision.

These and other objects are obtained by providing an image forming apparatus with a beam generator for generating a beam for recording. A scanner causes the generated beam to scan at intervals corresponding to a recording direction along a recording medium, thereby to record an image on the recording medium. A controller controls the scanner to adjust the recording position on the recording medium, the position being adjusted at an interval shorter than the scanning interval.

The above and other objects, features and advantages of the present invention will become more apparent from the following description of the invention when read in conjunction with the accompanying drawings.

DESCRIPTION OF THE PREFERRED EMBODIMENTS

Referring now to the accompanying drawings, an embodiment of the present embodiment will be described in detail. Incidentally, the present invention can be applied to the arrangements shown in FIGS. 7 and 8.

Figure 1:
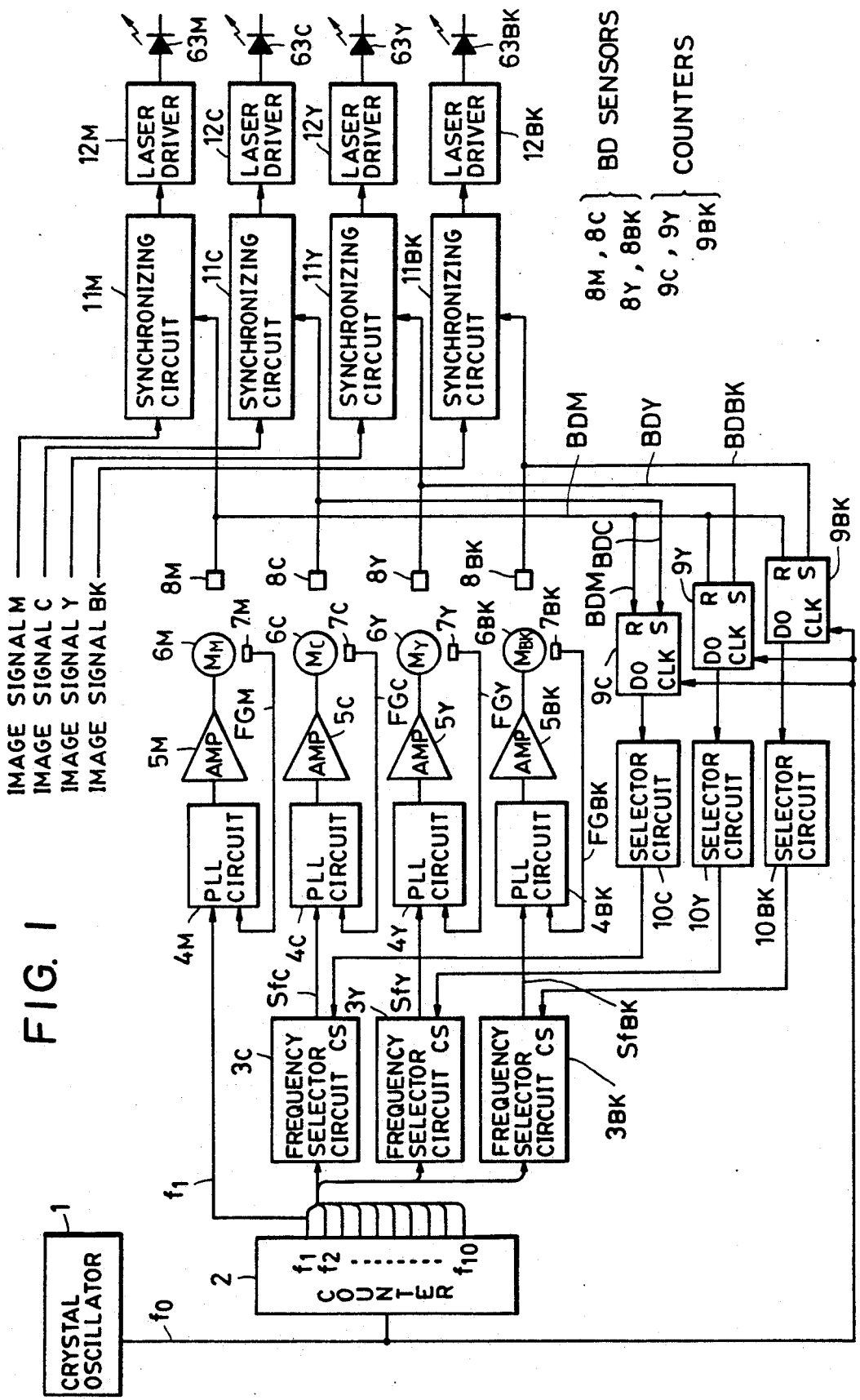
FIG. 1 is a block diagram of a circuit illustrating the configuration of a laser beam printer registration device in accordance with a first embodiment of the present invention.

FIG. 1 is a block diagram of a circuit illustrating a configuration of a laser beam printer registration device in accordance with an embodiment of the present invention. In the drawing, a crystal oscillator 1 constitutes a means for generating a reference frequency signal and is adapted to output a reference frequency signal $f_0$ of, for instance, 20 kHz to a counter 2 and to clock input terminals of counters 9C, 9Y and 9BK. The counter 2 divides the input reference frequency signal $f_0$ into ten equal parts and outputs the divided 2 kHz reference frequency signals as, for instance, reference frequency signals $f_1$ to $f_{10}$ having ten different phases. A frequency selector circuit 3C, which constitutes a first phase adjusting means, selects one reference frequency signal from among the reference frequency signals $f_1$ to $f_{10}$ that are output from the counter 2, on the basis of a select signal input from a selector circuit 10C to a chip selector input CS. A frequency selector circuit 3Y, which constitutes a second phase adjusting means, selects one reference frequency signal from among the reference frequency signals $f_1$ to $f_{10}$ that are output from the counter 2, on the basis of a select signal input from a selector circuit 10Y to a chip selector input CS. A frequency selector circuit 3BK, which constitutes a third phase adjusting means, selects one reference frequency signal from among the reference frequency signals $f_1$ to $f_{10}$ output from the counter 2, on the basis of a select signal output from a selector circuit 10BK to a chip selector input CS.

A PLL circuit 4M, which constitutes a first PLL controlling means, outputs a drive signal for driving a scanner motor 6M to an amplifier 5M, on the basis of the reference frequency signal $f_1$ input. In addition, a signal representing the rotating speed of the scanner motor 6M is monitored by an FG sensor 7M, and a detected speed control signal FGM is output to the PLL circuit 4M. The PLL circuit 4M controls a driving current to be applied to the amplifier 5M, in such a manner as to eliminate a phase difference between the frequency of the speed control signal $FG_M$ and the reference frequency signal $f_1$.

A PLL circuit 4C, which constitutes a second PLL controlling means, outputs a driving signal for driving a scanner motor 6C to an amplifier 5C, on the basis of the reference frequency signal $Sf_C$ selected. In addition, a signal representing the rotating speed of the scanner motor 6C is monitored by an FG sensor 7C, and a detected speed control signal $FG_C$ is output to the PLL circuit 4C. The PLL circuit 4C controls a driving current to be applied to the amplifier 5C, in such a manner as to eliminate a phase difference between the frequency of the speed control signal $FG_c$ and the reference frequency signal $Sf_c$. controlling means, outputs a driving signal for driving the scanner motor 6Y to an amplifier 5Y, on the basis of the reference frequency signal SfY selected. In addition, a signal representing the rotating speed of the scanner motor 6Y is monitored by an FG sensor 7Y, and a detected speed signal $FG_Y$ is output to the PLL circuit 4Y. The PLL circuit 4Y controls a driving current to be applied to the amplifier 5Y, in such a manner as to eliminate a phase difference between the frequency of the speed control signal $FG_Y$ and the reference frequency signal $Sf_Y$.

A PLL circuit 4BK, which constitutes a fourth PLL controlling means, outputs a driving signal for driving the scanner motor 6BK to an amplifier 5BK, on the basis of the reference frequency signal $Sf_{BK}$ selected. In addition, a signal representing the rotating speed of the scanner motor 6BK is monitored by an FG sensor 7BK, and a detected speed control signal $FG_{BK}$ is output to the PLL circuit 4BK. The PLL circuit 4BK controls a driving current to be applied to the amplifier 5BK, in such a manner as to eliminate a phase difference between the frequency of the speed control signal $FG_{BK}$ and the reference frequency signal $Sf_{BK}$.

A BD (beam detection) sensor 8M receives a laser beam emitted from the semiconductor laser 63M, before the writing of an image, and inputs a beam detection signal BDM, which serves as a horizontal synchronizing signal, to reset terminals R of the counters 9C, 9Y and 9BK and to a synchronizing circuit 11M.

A BD sensor 8C receives a laser beam emitted from the semiconductor laser 63C, before the writing of an image, and inputs a beam detection signal BDC, which serves as a horizontal synchronizing signal, to a set terminal S of the counter 9C and to a synchronizing circuit 11C.

A BD sensor 8Y receives a laser beam emitted from the semiconductor laser 63Y, before the writing of an image, and inputs a beam detection signal BDY, which serves as a horizontal synchronizing signal, to a set terminals S of the counter 9Y and to a synchronizing circuit 11Y.

A BD sensor 8BK receives a laser beam emitted from the semiconductor laser 63BK, before the writing of an image, and inputs a beam detection signal BDBK, which serves as a horizontal synchronizing signal, to a set terminals S of the counter 9BK and to a synchronizing circuit 11BK.

As described above, the BD sensors 8M, 8C, 8Y and 8BK generate signals respectively representing the scanning positions of the beams.

A laser driver 12M subjects the semiconductor laser 63M to ON/OFF modulation on the basis of an image signal M output from an external device, in synchronism with a carrier clock (not shown). In addition, the synchronizing circuit 11M determines the timing of application of the image signal M to the laser driver 12M in synchronism with the beam detection signal BDM.

A laser driver 12C subjects the semiconductor laser 63C to ON/OFF modulation on the basis of an image signal C output from an external device. In addition, the synchronizing circuit 11C determines the timing of application of the image signal C to the laser driver 12C in synchronism with the beam detection signal BDC.

A laser driver 12Y subjects the semiconductor laser 63Y to ON/OFF modulation on the basis of an image signal Y output from an external device. In addition, the synchronizing circuit 11Y determines the timing of application of the image signal Y to the laser driver 12Y in synchronism with the beam detection signal BDY.

A laser driver 12BK subjects the semiconductor laser 63BK to ON/OFF modulation on the basis of an image signal BK output from an external device. In addition, the synchronizing circuit 11BK determines the timing of application of the image signal BK to the laser driver 12BK in synchronism with the beam detection signal BDBK.

The selector circuits 10C, 10Y and 10BK are respectively provided with ROM tables and are adapted to output reference frequency signals for minimizing amounts of BD phase shift respectively counted by the counters 9C, 9Y and 9BK on the basis of the reference frequency signal $f_0$ to the chip selectors CS of the corresponding frequency selector circuits 3C, 3Y and 3BK. These reference signals that are output by the selector circuits 10C, 10Y and 10BK are selection signals (e.g., 4 bits) for selecting any one of the reference frequency signals $f_1$ to $f_{10}$.

Figure 2:
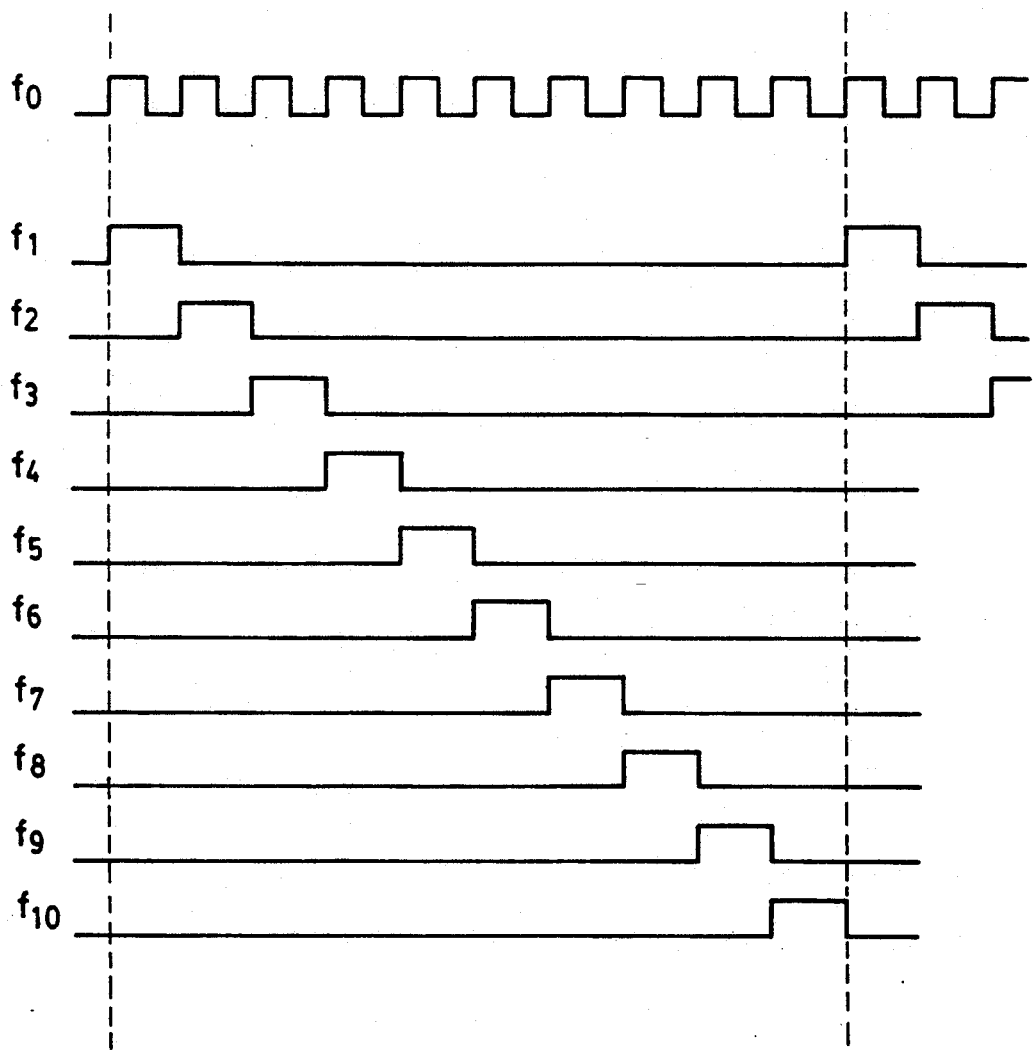
FIG. 2 is a timing chart illustrating a reference frequency signal output from a counter shown in FIG. 1.

FIG. 2 is a timing chart describing the reference frequency signals $f_1$ to $f_{10}$ output by the counter 2 shown in FIG. 1.

As is apparent from this drawing, the reference frequency signals $f_1$ to $f_{10}$ have phase differences that can be consecutively counted in synchronism with the rise of the reference frequency signal $f_0$.

Figure 3:
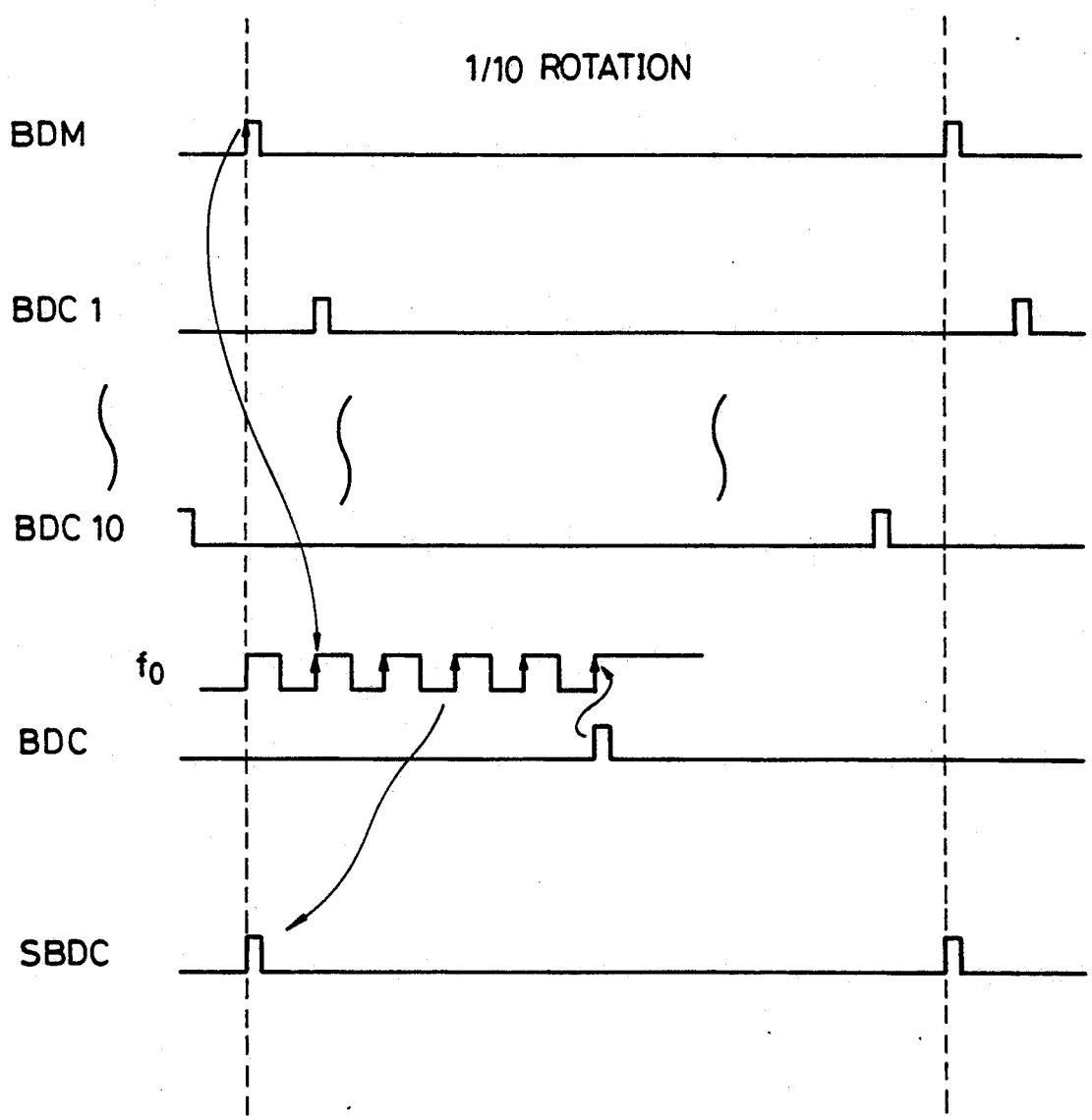
FIG. 3 is a timing chart illustrating the operation of registration in the embodiment of FIG. 1.

Referring now to FIG. 3, a description will be made of the operation of adjusting the top margin.

FIG. 3 is a timing chart illustrating the operation of adjusting registration. In the drawing, the same components as those shown in FIG. 1 are denoted by the same reference numerals.

In this drawing, BDC1 to BDC10 indicate various possible states of phase shift of the beam detection signal which may occur in the cyan station CS, while SBDC indicates a synchronized beam detection signal of the cyan station CS, which is synchronous with the beam detection signal BDM of the magenta station MS. For example, when the counter 9C counts a phase difference between the beam detection signal BDM and the beam detection signal BDC on the basis of the reference frequency signal $f_0$, if five steps are counted, the frequency selector circuit 3C selects a reference frequency signal which compensates for a lag of five steps, from among the frequencies $f_1$ to $f_{10}$. As a result, a beam detection signal SBDC with a new phase which is synchronous with the beam detection signal BDM is formed. A detailed description will be given hereafter of the operation of controlling adjustment by taking the case of the magenta station MS and the cyan station CS as an example.

Figure 8:
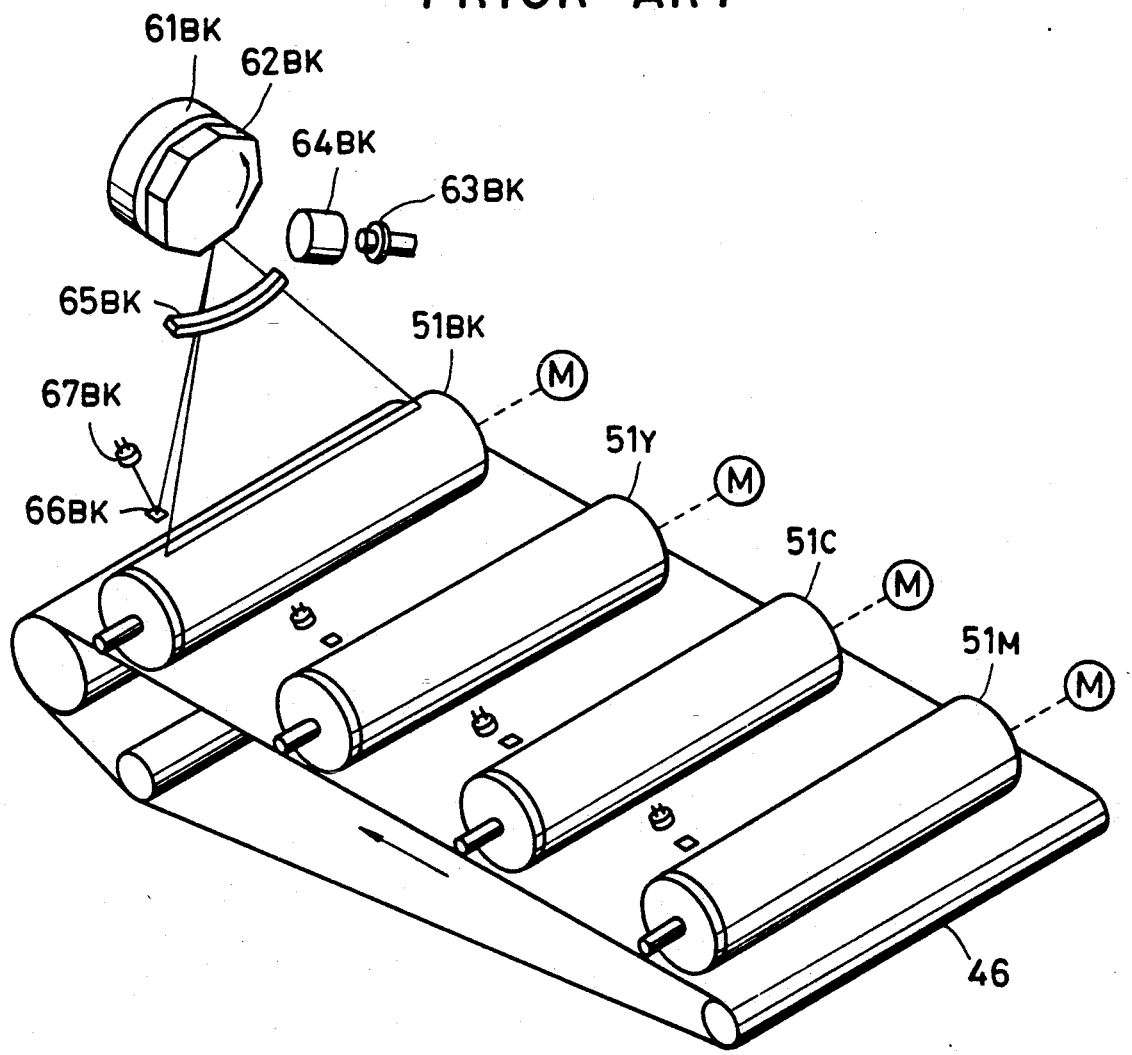
FIG. 8 is a perspective view illustrating a laser beam scanning arrangement according to the present invention as applied to the printer shown in FIG. 7.
Figure 9:
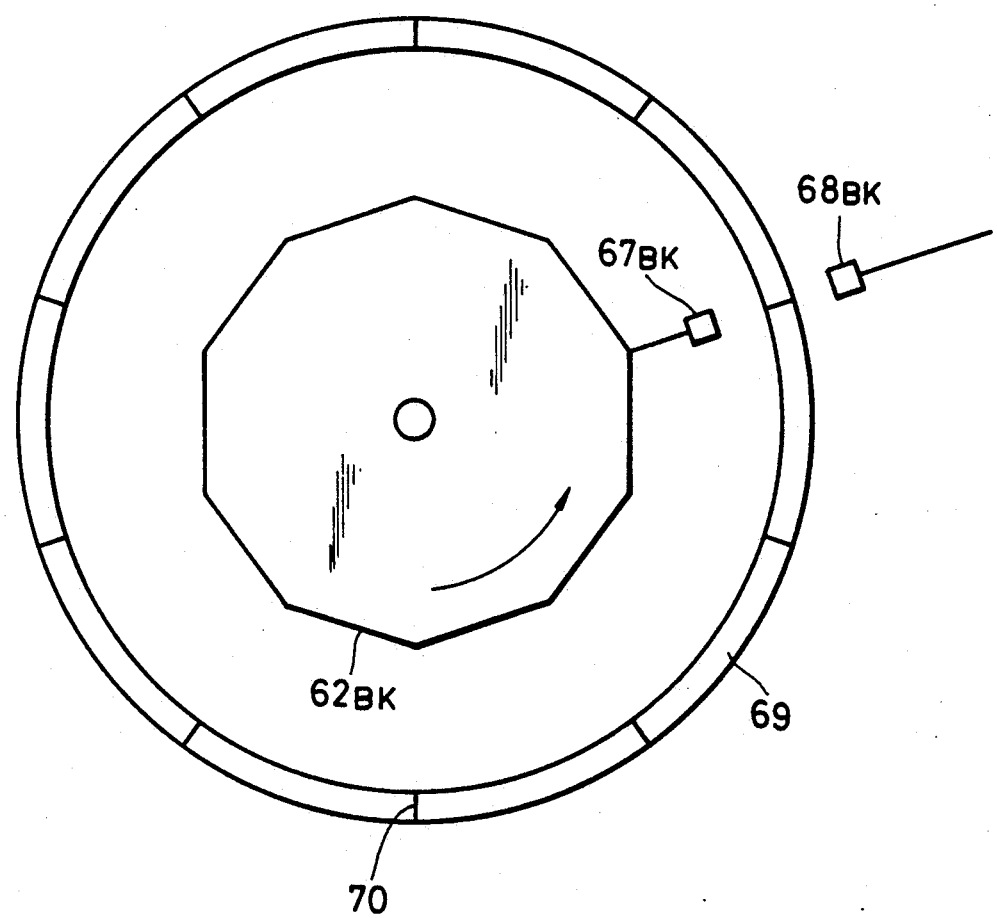
FIG. 9 is a top plan view illustrating an arrangement for detecting the rotating speed of the polygon mirror shown in FIG. 8.

First, when the laser beam emitted from the semiconductor laser 63M of the magenta station MS is deflected by the polygon mirror 62M and is detected by a BD sensor 8M disposed at a position corresponding to that shown for the black station BK in FIG. 8, the beam detection signal BDM shown in FIG. 3 is output from the BD sensor 8M to the reset terminals R of the counters 9C, 9Y and 9BK. Then, the counters 9C, 9Y and 9BK start the operation of counting the respective phase differences on the basis of the reference frequency signal $f_0$.

Subsequently, when the laser beam emitted from the semiconductor laser 63C of the cyan station CS is deflected by the polygon mirror 62C and is detected by the BD sensor 8C disposed at the position shown in FIG. 8, and when the beam detection signal BDC shown in FIG. 3 is input to the set terminal S of the counter 9C, the counting operation of the counter 9C stops, and and the count data ("5" steps) is output to the selector circuit 10C. In response to this, the selector circuit 10C inputs to the chip selector input CS of the frequency selector circuit 3C a selection signal for selecting one of the reference frequency signals $f_1$ to $f_{10}$, which serves as an optimum reference frequency signal $Sf_C$ for returning the phase of the beam detection signal BDC by a portion of the steps counted by reference to the ROM table. Accordingly, the frequency selector circuit 3C selects only one of the reference frequency signals $f_1$ to $f_{10}$, and the beam detection signal SBDC with a new synchronized phase (the same phase as that of the beam detection signal BDM) is thereafter output from the BD sensor 8C, as shown in FIG. 3. Incidentally, in this embodiment, since it is possible to change over one face of the polygon mirror 62M consisting of ten mirrors in a 1/10 step, when writing with a resolution of, for instance, 16 pel, one horizontal scanning interval becomes a 62.5 μm pitch. Hence, the phase adjustment becomes possible in 6.25 μm units.

However, even if the phase difference between the magenta station MS and the cyan station CS is zero unless the accuracy of the interval between the stations is 62.5 μm or below, the phases for forming the latent images on the photosensitive drums 51M, 51C, 51Y, and 51BK do not coincide with each other. Accordingly, it is necessary to detect the positional relationships between the stations and to correct the contents of the selection signals output from the selector circuits 10C, 10Y and 10BK on the basis of the positional relationships.

A description will now be given of the operation of controlling the phase difference on the basis of the relationships among the installation positions of the respective stations.

Figure 4:
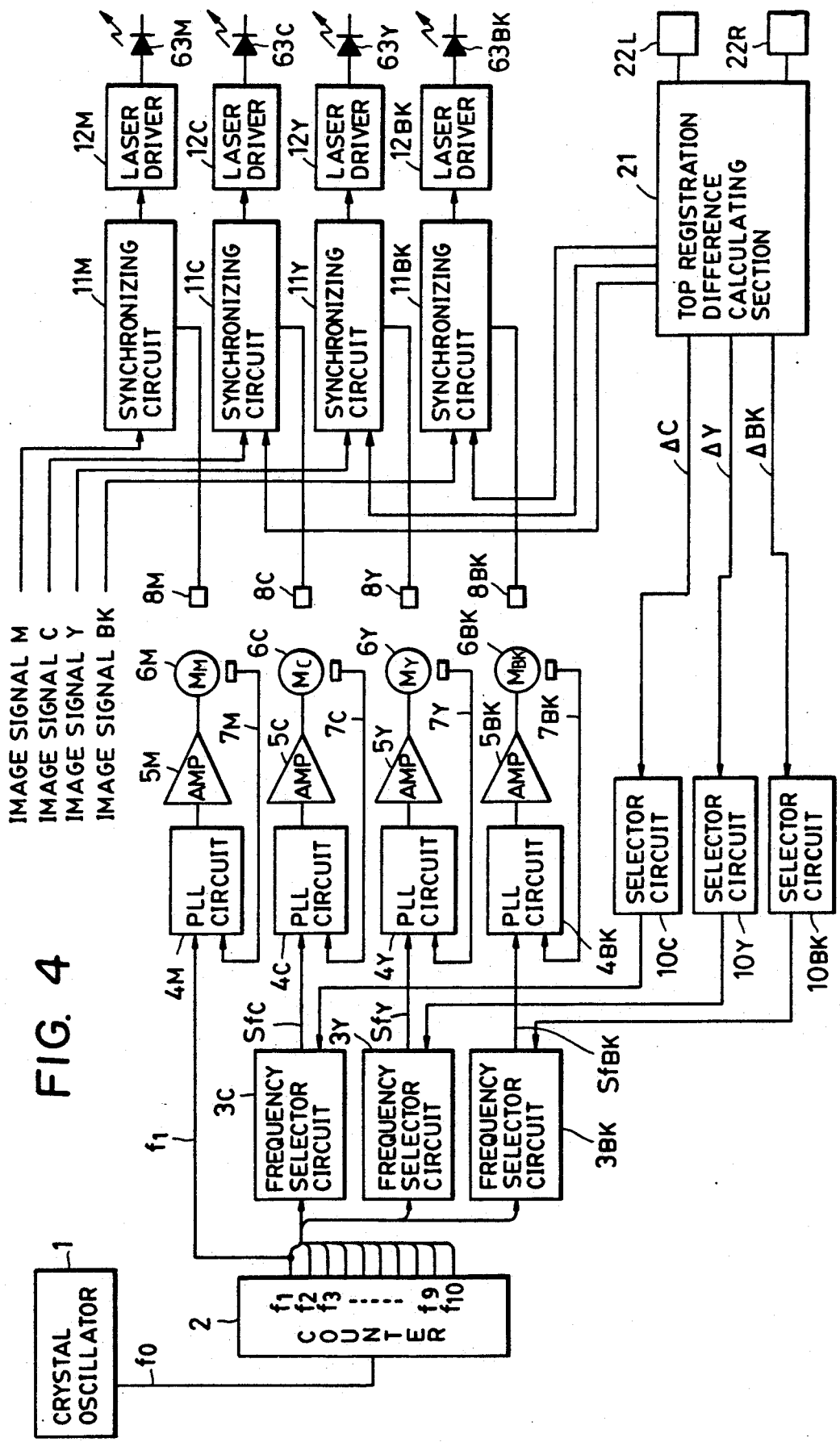
FIG. 4 is a block diagram of a circuit illustrating the configuration of a laser beam printer registration device in accordance with a second embodiment of the present invention.

FIG. 4 is a block diagram of a circuit illustrating the laser beam printer registration device in accordance with a second embodiment of the present invention. In the drawing, the same components as those shown in FIG. 1 are denoted by the same reference numerals.

In this drawing, a left registration sensor (left sensor) $22_L$ and a right registration sensor (right sensor) $22_R$ detect registrations marks (to be described later) prepared by the respective stations. A top registration difference calculating section 21 calculates a registration interval prepared by the respective stations by using outputs of the left sensor $22_L$ and the right sensor $22_R$, i.e., performs a calculation as to whether a difference between the registration mark of magenta prepared first on the one hand, and registration marks of cyan, yellow and black consecutively prepared on the other, is an integral multiple of the aforementioned 62.5 μm pitch, and outputs the remainder to the selector circuits 10C, 10Y and 10BK as the amounts of offset (differences ΔC, ΔY, ΔBK) of the respective stations. The selector circuits 10C, 10Y and 10BK output to the selector circuits 3C, 3Y and 3BK selection signals for selecting any one of the reference frequency signals $f_1$ to $f_{10}$ that will absorb deviations in registration corresponding to the deviations in the installation positions of the respective stations.

In this case, the counters 9C, 9Y and 9BK (of FIG. 1) are omitted.

In addition, the compensation of the amount of deviation of an integral multiple of the 62.5 μm pitch, i.e., the amount of deviation in line units, is carried out by the synchronizing circuits 11C, 11Y and 11BK when the results of calculation by the top registration difference section 21 are input to the synchronizing circuits 11C, 11Y and 11BK. Namely, in the synchronizing circuits, the compensation of the amount of deviation for each line is carried out by changing over the timing of reading image signals for each line (i.e. by changing over the counts of the BD signals).

Figure 5:
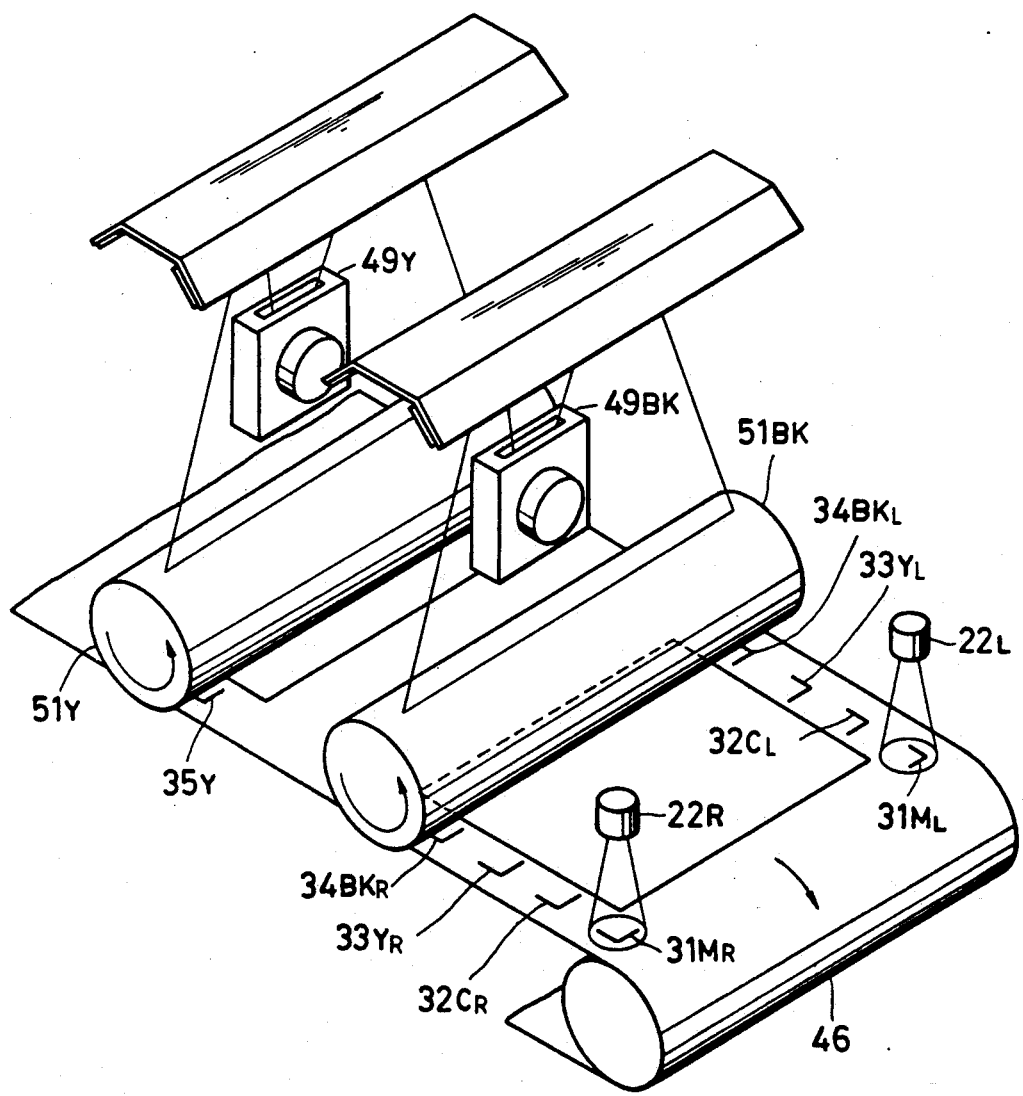
FIG. 5 is a perspective view illustrating the arrangement of left and right sensors shown in FIG. 4.
Figure 7:
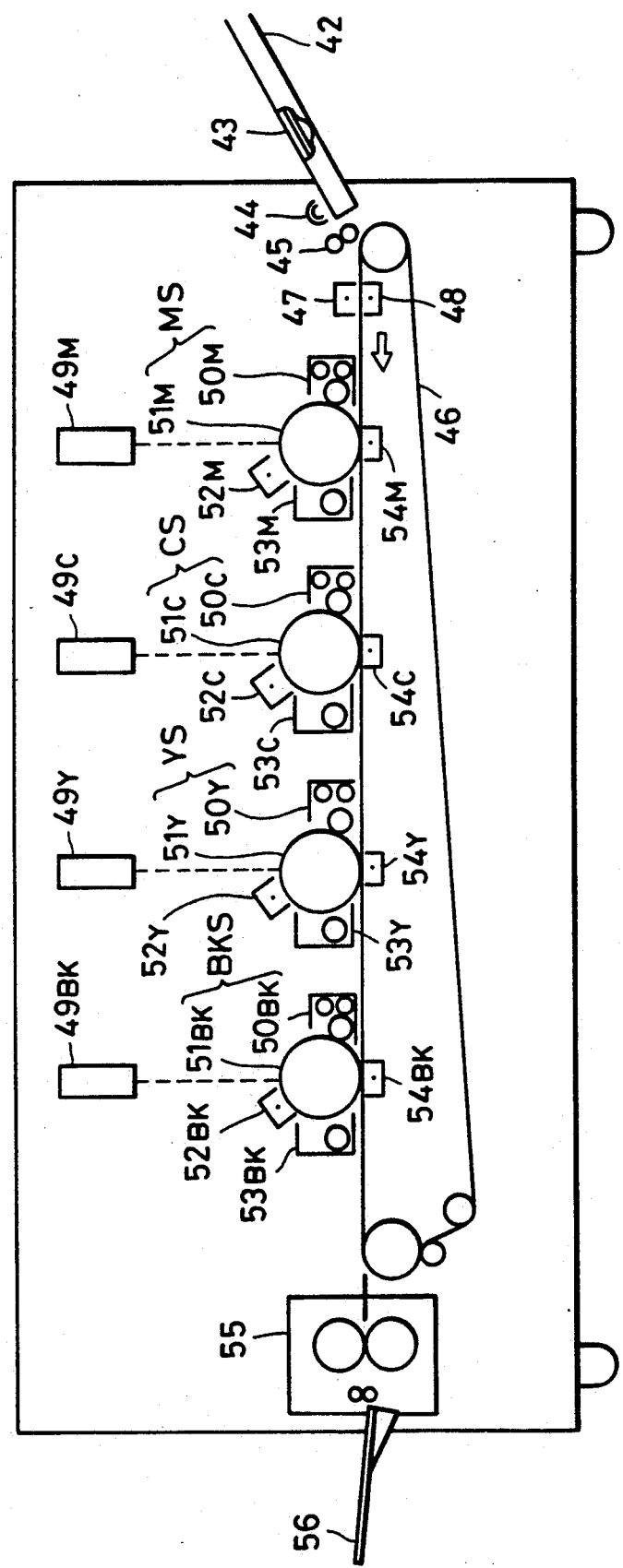
FIG. 7 is a cross-sectional view illustrating a structure of a laser beam printer of a known four-drum system.

FIG. 5 is a perspective view illustrating the arrangement of the left sensor 22L and the right sensor 22R, those components that are identical with those shown in FIGS. 4 and 7 being denoted by the same reference numerals.

In this drawing, a left registration mark (mark) $31M_L$ for magenta is formed by the magenta station MS (not shown). A right registration mark (mark) $31M_R$ for magenta is formed by the magenta station MS (not shown).

A left registration mark (mark) $32C_L$ for cyan is formed by the cyan station (not shown). A right registration mark (mark) $32C_R$ for cyan is formed by the cyan station CS (not shown).

A left registration mark (mark) $33Y_L$ for yellow is formed by the yellow station YS. A right registration mark (mark) $33Y_R$ for yellow is formed by the yellow station YS.

A left registration mark (mark) $34BK_L$ for black is formed by the black station BKS. A right registration mark (mark) $34BK_R$ for black is formed by the black station BKS.

First, a latent image corresponding to the marks $31M_L$ and $31M_R$ is formed by the laser unit 49M in the magenta station MS, and an image is formed from this latent image on the basis of a known electrophotographic process, and the marks $32C_L$, $32C_R$, $33Y_L$, $33Y_R$, $34BK_L$ and $34BK_R$ are similarly formed (transferred) on the conveying belt 46 and the black station BK and at predetermined intervals. The formed marks $32C_L$, $32C_R$, $33Y_L$, $33Y_R$, $34BK_L$ and $34BK_R$ are detected consecutively by the left sensor $22_L$ and the right sensor $22_R$, and the interval therebetween is calculated by the top registration difference calculating section 21, for example, by averaging the outputs of the two sensors. Namely, a calculation is carried out as to whether the interval is an integral multiple of the 62.5 μm pitch, and the remainder is output to the selector circuits 10C, 10Y and 10BK as the amounts of deviation of the stations (differences ΔC, ΔY, ΔBK) of the respective stations. The selector circuits 10C, 10Y and 10BK output to the selector circuits 3C, 3Y and 3BK selection signals for selecting any one of the reference frequency signals f1 to f10 that will absorb deviations in registration corresponding to the deviations in the installation positions of the respective stations. In addition, the amounts of deviation for each line are supplied to the synchronizing circuits 11C, 11Y and 11BK. It should be noted that, although in this embodiment a description has been given of a case where the registration interval is detected by the two sensors, i.e., the left sensor $22_L$ and the right sensor $22_R$, only one sensor may be used since it suffices if only the mark top in the advancing direction of the paper can be detected.

As a result, the deviations in registration resulting from the installing accuracy of the respective stations can be converted to an integral multiple of the 62.5 μm pitch.

Figure 6:
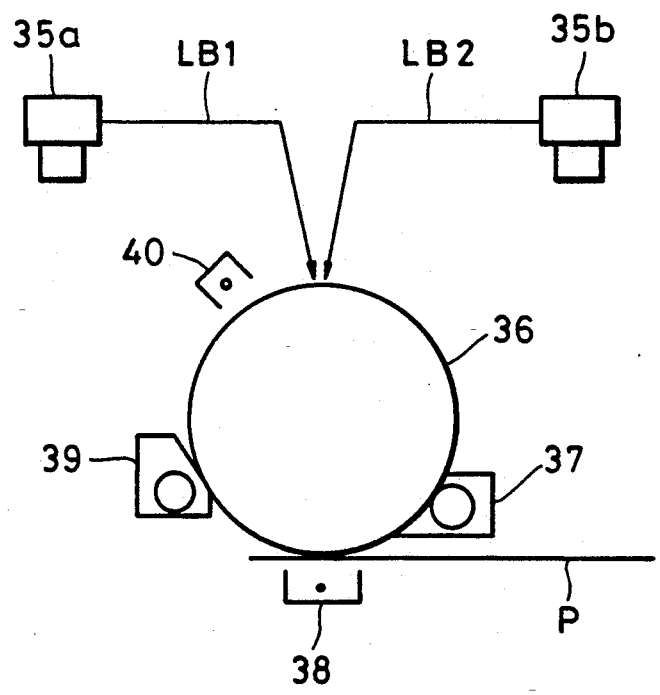
FIG. 6 is a cross-sectional view illustrating a structure of another laser beam printer to which the present invention is applied.

FIG. 6 is a cross-sectional view illustrating a structure of another laser beam printer to which the present invention may be applied. In the drawing, laser units 35a, 35b cause laser beams LB1, LB2 to scan the photosensitive drum 36 in correspondence with an image signal. A developer 37 develops an electrostatic image formed on a photosensitive drum 36 into a single color. A transfer charger 38 transfers the toner image so developed onto recording paper P. A cleaner section 39 recovers residual toner. A charger 40 charges the photosensitive drum 36 uniformly.

As is evident from this drawing, deviations in the positions of the photosensitive drum 36 scanned by the laser beams LB1, LB2 emitted from the laser units 35a, 35b can be adjusted by a scanner rotation controlling section shown in FIG. 1. In other words, the deviation in scanning can be adjusted by selecting any one of the reference frequency signals $f_1$ to $f_{10}$ and inputting the same to the PLL circuit for controlling the scanner motor of either of the laser units.

Although, in the foregoing embodiment, a description has been given of a phase difference between the beam detection signals BDC, BDY, BDBK and the beam detection signal BDM which is measured by a hardware circuit, and selection signals commensurate with the same are output to the corresponding frequency selector circuits 3C, 3Y, 3BK by a hardware circuit, the same effect can be obtained by software processing including a microprocessor processing unit using a microcomputer or the like, in which, for instance, reference frequency signal ports are changed over respectively by observing phase differences, and a switch changing-over operation (multiplexor processing) is continued until the phase differences converge.

In addition, although, in the foregoing embodiment, a description has been given of a case where the phase difference is adjusted by the counter 2 by a 1/10 pitch, it goes without saying that the phase difference can be adjusted by a finer pitch by increasing the dividing ratio of the counter 2.

As described above, since each of the PLL controlling means is provided with a reference frequency signal generating means for generating a reference frequency signal; a timing measuring means for measuring, on the basis of the reference frequency signal, differences between the output timing of horizontal synchronization signals output from one particular synchronizing sensor and the remaining synchronizing sensors; and a phase adjusting means for adjusting the phase of the reference frequency signal supplied to the PLL controlling means on the basis of the respective differences measured by this timing measuring means, phase shifts caused by polygon mirrors which deflect laser beams respectively emitted from laser beam units can be adjusted finely within distances of picture element units, and deviations in the top lines on the respective photosensitive drums scanned by the laser beams reflected by the polygon mirrors can be set to a minimum. Accordingly, the stringency in the accuracy of the installation position of an FG sensor for detecting a speed control signal can be alleviated substantially. At the same time, the control of the accuracy of assembling scanner motors can be simplified, and the installation position of the scanner motors can be readily adjusted even if the positions are offset by the distance of the dot pitch of the laser beam or below. Consequently, the present invention has outstanding advantages in that it is possible to superpose the images formed by a photosensitive material without positional deviations, and that fine black characters can be output clearly. As many apparently widely different embodiments of this invention may be made without departing from the spirit and scope thereof, it is to be understood that the invention is not limited to the specific embodiments thereof set forth above, but is to be defined in the appended claims.

What is claimed is:

1. A recording apparatus comprising:
   beam generating means for generating a beam;
   scanning means for causing said beam generated by said beam generating means to scan at intervals corresponding to a recording direction along a recording medium, thereby to record an image on the recording medium; and
   control means for controlling drive timing and said scanning means so as to adjust a recording position on the recording medium of said image, the recording position being adjusted at an interval shorter than the scanning interval of said beam.

2. A recording apparatus according to claim 1, wherein said scanning means comprises deflection means for deflecting said beam, a motor for driving said deflecting means, and driving means for driving said motor on the basis of a predetermined clock signal, and said controlling means is adapted to adjust a phase of said clock signal and control said drive timing of said scanning means.

3. A recording apparatus according to claim 1, wherein said beam generating means has first and second beam generating sections, said scanning means has first and second scanning sections for allowing said first and second beams generated by said first and second beam generating sections to effect scanning independently, and wherein said recording medium is constituted by first and second photosensitive bodies which are respectively irradiated with said first and second beams made to scan from said first and second scanning sections, said apparatus further comprising means for recording first and second images formed on said first and second photosensitive bodies onto a common sheet.

4. A recording apparatus according to claim 3, further comprising first and second detecting means for independently detecting scanning positions of said first and second beams in said first and second scanning sections and for defining recording positions on said first and second photosensitive bodies, said controlling means controlling at least a drive timing of said first scanning section on the basis of said first and second detection signals.

5. A recording apparatus according to claim 3, further comprising deviation amount detecting means for detecting an amount of deviation of said first and second images recorded by said recording means, wherein said first and second scanning sections comprise first and second deflecting sections for deflecting said first and second beams, first and second motors for driving said first and second deflecting sections, and first and second driving sections for driving said first and second motors on the basis of first and second clock signals, and said controlling means is adapted to adjust the phase of said second clock with respect to said first clock in accordance with the result of detection by said deviation amount detecting means.

6. A recording apparatus comprising:
   beam generating means for generating a beam;
   scanning means for scanning a recording medium at intervals corresponding to a recording direction along the recording medium with said beam and for outputting a detection signal for defining a recording position on said recording medium;
   means for adjusting an output timing of said detection signal from said detecting means; and
   control means for controlling drive timing of said scanning means so as to adjust the recording position on the recording medium, the recording position being adjusted at an interval shorter than the scanning interval of said beam.

7. A recording apparatus according to claim 6, wherein said scanning means comprises deflecting means for deflecting said beam, a motor for driving said deflecting means, and driving means for driving said motor on the basis of a predetermined clock signal, and said adjusting means is adapted to adjust a phase of said clock signal and an output timing of said detection signal.

8. A recording apparatus according to claim 6, wherein said beam generating means has first and second beam generating sections, said scanning means has first and second scanning sections for allowing said first and second beams generated by said first and second beam generating sections to effect scanning independently, and said recording medium is constituted by first and second photosensitive bodies which are respectively irradiated with said first and second beams made to scan from said first and second scanning sections, said apparatus further comprising means for recording first and second images formed on said first and second photosensitive bodies onto a common sheet.

9. A recording apparatus comprising:
   beam generating means for generating a beam;
   scanning means for scanning a recording medium with said beam generated by said beam generating means;
   detecting means for detecting a position scanned by said scanning means with said beam and for outputting a detection signal for defining a recording position on said recording medium;
   means for adjusting an output timing of said detection signal from said detecting means;
   said beam generating means having first and second beam generating sections, said scanning means having first and second scanning sections for allowing said first and second beams generated by said first and second beam generating sections to effect scanning independently, and said recording medium being constituted by first and second photosensitive bodies which are respectively irradiated with said first and second beams made to scan from said first and second scanning sections;
   means for recording first and second images formed on said first and second photosensitive bodies onto a common sheet; and
   deviation amount detecting means for detecting an amount of deviation of said first and second images recorded by said recording means, wherein said first and second scanning sections comprise first and second deflecting sections for deflecting said first and second beams, first and second motors for driving said first and second deflecting sections, and first and second driving sections for driving said first and second motors on the basis of first and second clock signals, and said adjusting means is adapted to adjust the phase of said second clock with respect to said first clock in accordance with the result of detection by said deviation amount detecting means and to adjust an output timing of said detection signal.

10. A recording apparatus comprising:
beam generating means for generating a beam;
scanning means for scanning a recording medium with the beam generated by said beam generating means, said scanning means having deflecting means for deflecting said beam, a motor for driving said deflecting means, and driving means for driving said motor on the basis of a predetermined clock signal;
deviation amount detecting means for detecting an amount of deviation of an image formed on said recording medium; and
controlling means for controlling a phase of said clock signal in accordance with the amount of deviation detected by said detecting means.

11. A recording apparatus comprising:
a plurality of image forming stations, including first and second image forming stations, each of said image forming stations effecting image formation by scanning at intervals relative to a recording direction;
feed means for feeding a recording medium from said first image forming station to said second image forming station; and
synchronizing means for synchronizing said first image forming station and said second image forming station so that corresponding image portions are substantially superposed, said synchronizing means controlling relative scanning position in said first and second image forming stations, the scanning position being controlled at an interval shorter than the scanning interval.

12. A recording apparatus according to claim 10, wherein said beam generating means has first and second beam generating sections, said scanning means has first and second scanning sections for allowing said first and second beams generated by said first and second beam generating sections to effect scanning independently, and wherein said recording medium is constituted by first and second photosensitive bodies which are respectively irradiated with said first and second beams made to scan from said first and second scanning sections, said apparatus further comprising means for recording first and second images formed on said first and second photosensitive bodies onto a common sheet.

13. A recording apparatus comprising:
recording means for recording at least two different images each from other on a recording medium, each of said different images being recorded at predetermined recording intervals relative to a recording direction;
a feeder which is caused to feed the recording medium on which said two different images are produced;
adjusting means for adjusting a relative position of said two different images, the relative position being adjusted at an interval shorter than the predetermined recording interval.

14. A recording apparatus according to claim 13, wherein said recording means has at least two recording stations, each station effecting recording one of said two different images.

15. A recording apparatus according to claim 13, wherein said recording means is caused to record different color images.

16. A recording apparatus according to claim 13, further comprising a detector for detecting the relative position and for outputting a detection signal for defining the relative position, wherein said adjusting means adjusts the relative positions in response to the detection signal.

* * * * *

UNITED STATES PATENT AND TRADEMARK OFFICE
CERTIFICATE OF CORRECTION

PATENT NO. : 5,115,256
DATED : May 19, 1992
INVENTOR(S) : Ken Miyagi, et al.

It is certified that error appears in the above-identified patent and that said Letters Patent is hereby corrected as shown below:

Title page:

Under [30], Foreign Application Priority Data", "61-228474" should read --62-228474--.

COLUMN 1

Line 22, "stop" should read --stops--;
    Line 24, "feed" should read --feeds--; and
    Line 59, "conveyed" should read --conveyed.--.

COLUMN 2

Line 51, "drum 51M" should read --drum 51BK--.

COLUMN 6

Line 1, "$Sf_C$. controlling" should read
    --$Sf_C$.
        A PLL circuit 4Y, which constitutes a third PLL controlling--;
    Line 3, "SfY" should read --$Sf_Y$--;
    Line 40, "terminals" should read --terminal--; and
    Line 46, "terminals" should read --terminal--.

COLUMN 9

Line 37, "belt 46 and" should read --belt 46 consecutively in the cyan station CS, the yellow station YS and--.

UNITED STATES PATENT AND TRADEMARK OFFICE
CERTIFICATE OF CORRECTION

PATENT NO. : 5,115,256
DATED : May 19, 1992
INVENTOR(S) : Ken Miyagi, et al.

It is certified that error appears in the above-identified patent and that said Letters Patent is hereby corrected as shown below:

COLUMN 11

Line 14, "and" should read --of--; and
Line 68, "and" should read --generated by said beam generating means;
      detecting means for detecting a position scanned by said scanning means with said beam and--.

COLUMN 14

Line 12, "different" should read --images different from each--;
Line 13, "images each from" should be deleted; and
Line 19, "duced;" should read --duced; and--.

Signed and Sealed this

Twenty-first Day of December, 1993

Attest:

BRUCE LEHMAN

Attesting Officer    Commissioner of Patents and Trademarks